United States Patent
Watanabe

(10) Patent No.: US 8,344,283 B2
(45) Date of Patent: Jan. 1, 2013

(54) HEAD AND METHOD FOR LASER ARC HYBRID WELDING

(75) Inventor: Masao Watanabe, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 127 days.

(21) Appl. No.: 12/988,021

(22) PCT Filed: Apr. 14, 2009

(86) PCT No.: PCT/JP2009/057474
§ 371 (c)(1),
(2), (4) Date: Dec. 14, 2010

(87) PCT Pub. No.: WO2009/131031
PCT Pub. Date: Oct. 29, 2009

(65) Prior Publication Data
US 2011/0089149 A1  Apr. 21, 2011

(30) Foreign Application Priority Data
Apr. 24, 2008 (JP) ................................ 2008-113360

(51) Int. Cl.
*B23K 26/00* (2006.01)
(52) U.S. Cl. ................ 219/121.63; 219/121.64; 219/136
(58) Field of Classification Search ............. 219/121.63, 219/121.64, 136, 137 R, 121.45, 121.46
See application file for complete search history.

(56) References Cited

U.S. PATENT DOCUMENTS

| | | | |
|---|---|---|---|
| 6,294,754 B1 * | 9/2001 | Nagura et al. | 219/121.63 |
| 6,600,133 B2 * | 7/2003 | Watanabe et al. | 219/125.1 |
| 6,608,281 B2 * | 8/2003 | Ishide et al. | 219/121.78 |
| 6,664,507 B2 * | 12/2003 | Akaba et al. | 219/130.5 |
| 7,154,064 B2 * | 12/2006 | Wang et al. | 219/121.64 |
| 7,408,130 B2 * | 8/2008 | Sonoda et al. | 219/137 R |
| 2002/0017509 A1 | 2/2002 | Ishide et al. | |

FOREIGN PATENT DOCUMENTS

| | | |
|---|---|---|
| JP | 2001-205465 | 7/2001 |
| JP | 2002-59286 | 2/2002 |
| JP | 2002-192363 | 7/2002 |
| JP | 2006-21224 | 1/2006 |
| JP | 2007-50448 | 3/2007 |

OTHER PUBLICATIONS

International Search Report issued Jul. 14, 2009 in International (PCT) Application No. PCT/JP2009/057474.
Written Opinion of the International Searching Authority issued Jul. 14, 2009 in International (PCT) Application No. PCT/JP2009/057474.

* cited by examiner

*Primary Examiner* — M. Alexandra Elve
(74) *Attorney, Agent, or Firm* — Wenderoth, Lind & Ponack, L.L.P.

(57) ABSTRACT

A laser arc hybrid welding head and method which can form satisfactory beads at high speed are provided. A laser arc hybrid welding head (1) for welding a base material (W), which comprises aluminum steel sheets, by performing laser light irradiation and arc discharge, thereby combining laser welding and arc welding, splits inputted laser light (L0) into two beams, i.e., split laser light beams (L2a and L2b), then irradiates the base material (W) with the split laser light beams (L2a, L2b) while focusing these beams (L2a, L2b) on the base material (W), and also performs coaxial welding by generating an arc (A) from an arc electrode (20) disposed coaxially with the optical axis of the split laser light beams (L2a, L2b). Further, the transfer mode of a welding droplet from the arc electrode (20) is rendered spray transfer.

2 Claims, 1 Drawing Sheet

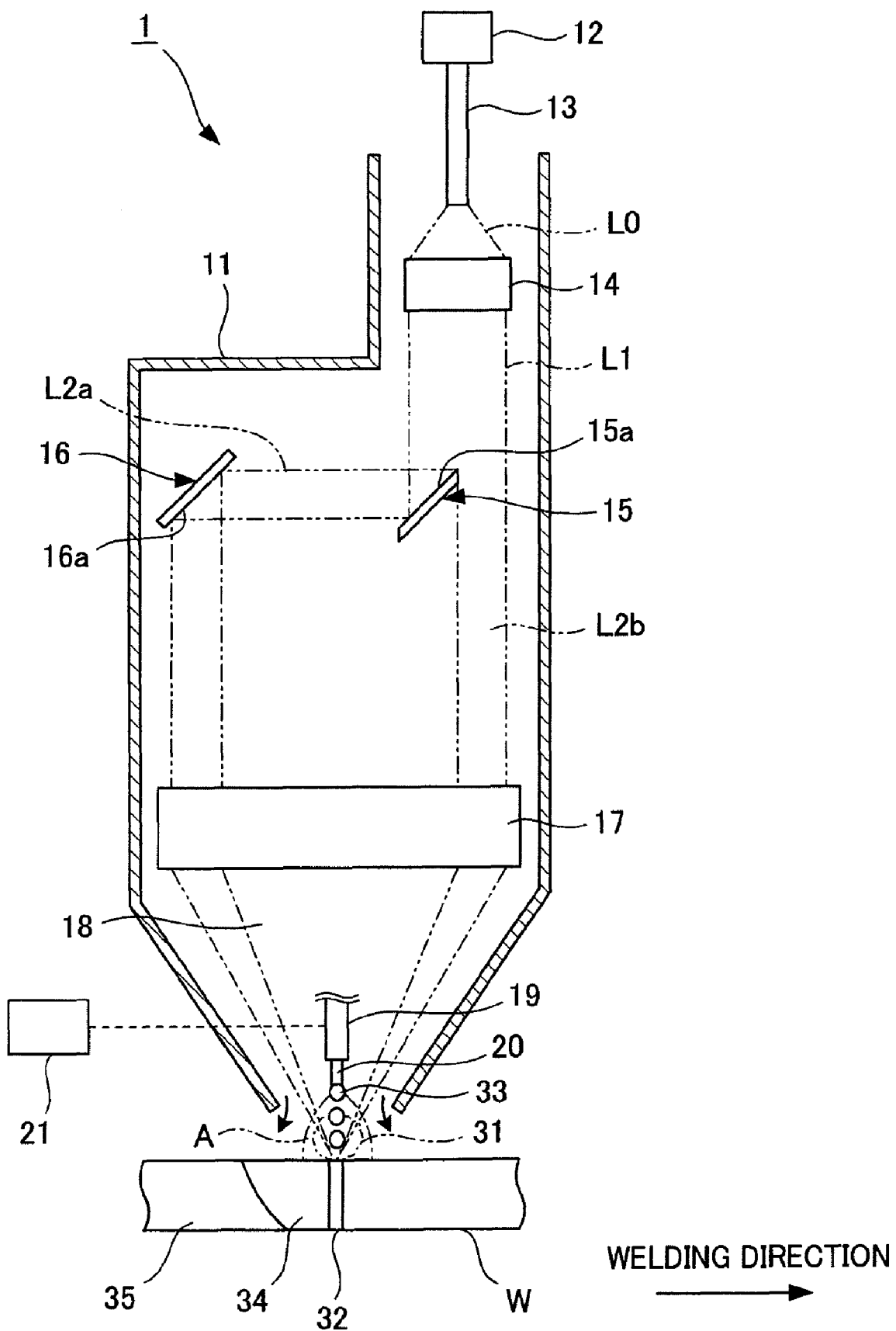

HEAD AND METHOD FOR LASER ARC HYBRID WELDING

TECHNICAL FIELD

This invention relates to a laser arc hybrid welding head and method which weld aluminum steel sheets by performing laser light irradiation and arc discharge, thereby combining laser welding and arc welding.

BACKGROUND ART

A laser welding method and an arc welding method are available as kinds of welding technologies for joining base materials of metals. Of them, the laser welding method performs welding by focusing laser light onto a point on the base material with the use of optical instruments such as a lens and a mirror. Since energy density is increased by this configuration, the laser welding method can carry out welding with a great depth of weld penetration, at high speed, and with low strain in a narrow fusion range.

The arc welding method generates arc between a base material and a welding wire or an electrode to fuse the base material by its heat, thereby performing welding while protecting the surroundings of a part of the base material, which is to be welded, with a shielding gas. By this procedure, the depth of weld penetration is small, but the arc spreads in a relatively wide range. Thus, welding with a broad bead width and a high groove tolerance can be performed.

In recent years, therefore, laser arc hybrid welding methods for simultaneously performing laser welding and arc welding have been studied with a view to performing welding with a great depth of weld penetration and a broad welding range. Such laser arc hybrid welding methods are disclosed, for example, in Patent Documents 1 and 2.

PRIOR ART LITERATURE

Patent Documents

Patent Document 1: JP-A-2002-192363
Patent Document 2: JP-A-2006-21224

SUMMARY OF THE INVENTION

Problems to be Solved by the Invention

With the above Patent Document 1, the temperature of a leading end portion of a welding wire is raised by laser light, and arc reignition at the time of switching the polarity of an alternating current arc is smoothed, whereby high speed welding can be achieved. With the above Patent Document 2, a fusion zone formed by irradiation with laser light and a fusion zone formed by application of arc are tied, and heat input by the arc is regulated, whereby high speed welding can be achieved.

In order to realize high speed welding in the laser arc hybrid welding method, the transfer of a welding droplet has to be carried out smoothly. Unless this droplet transfer is performed regularly, the arc becomes unstable, and nonuniform beads are formed. The aforementioned conventional laser arc hybrid welding methods, however, have not dealt with the mode of droplet transfer. This is not practical, and may fail to achieve high speed welding sufficiently.

Hence, the present invention is intended to solve the above-mentioned problems. It is an object of the present invention to provide a laser arc hybrid welding head and method which can form satisfactory beads at high speed.

Means for Solving the Problems

A laser arc hybrid welding head according to a first aspect of the present invention, intended for solving the above problems, is a laser arc hybrid welding head for fillet-welding or butt-welding aluminum steel sheets by performing laser light irradiation and arc discharge, thereby combining laser welding and arc welding, comprising:

a laser torch for irradiating the aluminum steel sheets with inputted laser light while focusing the inputted laser light on the aluminum steel sheets;

an arc electrode, provided coaxially with an optical axis of the laser light applied for irradiation and focused by the laser torch, for generating an arc between the arc electrode and the aluminum steel sheets; and arc control means for controlling a transfer mode of a welding droplet from the arc electrode to be spray transfer.

A laser arc hybrid welding method according to a second aspect of the present invention, intended for solving the above problems, is a laser arc hybrid welding method for fillet-welding or butt-welding aluminum steel sheets by performing laser light irradiation and arc discharge, thereby combining laser welding and arc welding, comprising:

irradiating the aluminum steel sheets with laser light while focusing the laser light on the aluminum steel sheets, and also generating an arc between an arc electrode, which is provided coaxially with an optical axis of the laser light, and the aluminum steel sheets; and rendering a transfer mode of a welding droplet from the arc electrode spray transfer.

Effects of the Invention

According to the laser arc hybrid welding head and method of the present invention, the arc electrode is provided coaxially with the optical axis of laser light projected onto and focused on aluminum steel sheets, and the transfer mode of the welding droplet from the arc electrode is rendered spray transfer. Thus, satisfactory beads can be formed at high speed.

BRIEF DESCRIPTION OF THE DRAWING

[FIG. 1] is a schematic configurational drawing of a laser arc hybrid welding head according to an embodiment of the present invention.

DETAILED DESCRIPTION OF THE INVENTION

The laser arc hybrid welding head and method according to the present invention will be described in detail below using the accompanying drawing.

Embodiment

As shown in FIG. 1, a laser arc hybrid welding head 1 is adapted to weld (fillet-weld or butt-weld) a base material W, which comprises two aluminum steel sheets, by using laser welding and arc welding in combination. The laser arc hybrid welding head 1 is provided with a cylindrical head body 11, and an YAG (yttrium aluminum garnet) laser oscillator 12 is connected to the upper end of the head body 11 via an optical fiber 13. The YAG laser oscillator 12 produces laser light L0, and this laser light L0 is transmitted by the optical fiber 13 and entered to the upper end side of the head body 11.

A collimating lens group 14 is provided below the optical fiber 13. The collimating lens group 14 is composed of a plurality of collimating lenses arranged in series, and allows the laser light L0 inputted by the optical fiber 13 to pass through its interior, thereby outputting it as a collimated parallel laser light beam L1.

A first reflecting mirror 15 and a second reflecting mirror 16 are provided below the collimating lens group 14. These reflecting mirrors 15, 16 are flat mirrors for reflecting laser light, and are arranged at the same position (height) in the axial direction of the head body 11.

The first reflecting mirror 15 is inserted into the parallel laser light beam L1, which has been outputted from the collimating lens group 14, up to a nearly central part of the cross section of the parallel laser light beam L1 in a direction orthogonal to the optical axis of the parallel laser light beam L1. The first reflecting mirror 15 is supported such that its reflecting surface 15a points upward, and faces toward the center of the head body. Thus, the first reflecting mirror 15 reflects part of the parallel laser light beam L1 toward the center of the head body, thereby splitting the parallel laser light beam L1 into two beams, namely, a first split laser light beam L2a which has been reflected, and a second split laser light beam L2b which has not been reflected.

The second reflecting mirror 16, on the other hand, is disposed parallel to the first reflecting mirror 15, and is supported such that its reflecting surface 16a points downward, and faces toward the center of the head body. Thus, the second reflecting mirror 16 reflects the first split laser light beam L2a, which has been reflected by the first reflecting mirror 15, further downward.

Further, a focusing lens group 17 is provided below the reflecting mirrors 15, 16. The focusing lens group 17 is composed of a plurality of focusing lenses arranged in series. The focusing lens group 17 allows the split laser light beams L2a, L2b, split and reflected by the reflecting mirrors 15, 16, to pass through its interior, thereby irradiating a part of the base material W, which is to be welded, with the split laser light beams L2a, L2b, while focusing the split laser light beams L2a, L2b on the part of the base material W to be welded.

An electrode head 19 is provided in a space portion 18 surrounded by the split laser light beams L2a, L2b below the focusing lens group 17. The electrode head 19 is supplied with a rod-shaped arc electrode 20, which consists essentially of aluminum, by an electrode supply device (not shown). The arc electrode 20 is supported by the electrode head 19, and is thereby disposed coaxially with the optical axis of the split laser light beams L2a, L2b being focused.

An arc control device (arc control means) 21 is connected to the head body 11. The arc control device 21 controls the electrode supply device to control the amount of supply of the arc electrode 20, sets a welding current and a welding voltage for generating an arc A between the arc electrode 20 and the part of the base material W to be welded, and supplies an inert gas (shielding gas) for ensuring the stability of the arc A and preventing the oxidation of the arc A.

In performing the welding of the base material W, therefore, the first step is to input the laser light L0 from the YAG laser oscillator 12 into the head body 11 via the optical fiber 13. The laser light L0 inputted into the head body 11 in this manner is directed toward the collimating lens group 14. The laser light L0 inputted into the collimating lens group 14 is passed through its interior, and is thereby outputted as the collimated parallel laser light beam L1.

Then, part of the parallel laser light beam L1 outputted from the collimating lens group 14 is reflected by the first reflecting mirror 15 in the direction orthogonal to the optical axis of the parallel laser light beam L1 to become the first split laser light beam L2a. Further, the first split laser light beam L2a is reflected by the second reflecting mirror 16 in the same direction as the optical axis of the parallel laser light beam L1.

On the other hand, the remaining part of the parallel laser light beam L1 that has not been reflected by the first reflecting mirror 15 serves as the second split laser light beam L2b, which travels as such in the same direction as the optical axis of the parallel laser light beam L1. As a result, the split laser light beams L2a, L2b travel in parallel, and are then inputted into the focusing lens group 17.

The split laser light beams L2a, L2b inputted into the focusing lens group 17 are passed through its interior, and are thereby converged and projected toward the part of the base material W to be welded. At the same time, in an inert gas atmosphere, the arc electrode 20 is continuously supplied to the electrode head 19 disposed in the space portion 18, and the arc A is generated between the supplied arc electrode 20 and the part of the base material W to be welded.

As described above, the optical axis of the split laser light beams L2a, L2b and the axis of the arc electrode 20 are arranged coaxially, and irradiation with the split laser light beams L2a, L2b and arc discharge to the base material W by the arc electrode 20 are performed coaxially. By so doing, coaxial welding which combines laser welding and arc welding is carried out for the base material W.

In such coaxial welding, moreover, the irradiation with the split laser light beams L2a, L2b focused renders energy density at the position of laser irradiation extremely high. Thus, the base material W instantaneously evaporates, and the resulting aluminum vapor 31 turns into a plasma. Also, the molten metal (aluminum) is pushed away to form a keyhole 32. As seen here, the aluminum vapor 31 falls into a plasma state, resulting in satisfactory current passage. Thus, the arc A generated by the arc electrode 20 becomes easily guided to the keyhole 32, with the result that the convergence and stability of the arc A are enhanced.

At the same time, the (pulse) current value, the voltage value, and the waveform are regulated by the arc control device 21, and the transfer mode of a welding droplet 33 from the arc electrode 20 is controlled by the arc control device 21 to be spray transfer. The amount of the molten metal blown away by the aluminum vapor 31 is replenished by supplying a molten pool 34 with the welding droplets 33 from the arc electrode 20 which consist essentially of aluminum. By this procedure, beads 35 without weld defects, such as blow holes, are formed.

The aluminum vapor 31 diffuses as it becomes farther from the keyhole 32, and its concentration is low in the surroundings of a leading end portion of the arc electrode 20. As mentioned above, however, the transfer mode of the welding droplets 33 consisting essentially of aluminum is rendered spray transfer. By this measure, the surroundings of the leading end portion of the arc electrode 20 are also in a high-concentration aluminum vapor atmosphere, and the range from this leading end portion to the keyhole 32 can be held in the high-concentration aluminum vapor atmosphere. Thus, the convergence and stability of the arc A are increased further, whereby welding at high speed can be achieved.

According to the laser arc hybrid welding head and method concerned with the present invention, therefore, the inputted laser light L0 is split into the two beams, i.e., the split laser light beams L2a and L2b. Then, the base material W is irradiated with the split laser light beams L2a, L2b, with these beams L2a, L2b being focused on the base material W. Also, the arc A is generated from the arc electrode 20 disposed coaxially with the optical axis of the split laser light beams L2a, L2b to perform coaxial welding. Further, the transfer mode of the welding droplets from the arc electrode 20 is rendered spray transfer, whereby satisfactory beads 35 can be formed at high speed.

Industrial Applicability

The present invention can be applied to a laser arc hybrid welding head designed to prevent the deposition of a metal vapor onto an arc electrode.

DESCRIPTION OF THE NUMERALS

1 Laser arc hybrid welding head, 11 Head body, 12 YAG laser oscillator, 13 Optical fiber, 14 Collimating lens group, 15 First reflecting mirror, 15a Reflecting surface, 16 Second reflecting mirror, 16a Reflecting surface, 17 Focusing lens group, 18 Space portion, 19 Electrode head, 20 Arc electrode, 21 Arc control device, 31 Aluminum vapor, 32 Keyhole, 33 Welding droplet, 34 Molten pool, 35 Bead, W Base material, L0 Laser light, L1 Parallel laser light beam, L2a First split laser light beam, L2b Second split laser light beam, A Arc.

The invention claimed is:

1. A laser arc hybrid welding head for fillet-welding or butt-welding aluminum steel sheets by performing laser light irradiation and arc discharge, thereby combining laser welding and arc welding, comprising:

a laser torch for irradiating the aluminum steel sheets with inputted laser light while focusing the inputted laser light on the aluminum steel sheets to diffuse an aluminum vapor in a plasma state from a position of laser irradiation onto the aluminum steel sheets, and to form a keyhole at the position of laser irradiation;

an arc electrode, consisting essentially of aluminum and provided coaxially with an optical axis of the laser light applied for irradiation and focused by the laser torch, for generating an arc between the arc electrode and the aluminum steel sheets; and arc control means for controlling a transfer mode of a welding droplet from the arc electrode to be spray transfer to hold a range from a leading end portion of the arc electrode to the keyhole in an aluminum vapor atmosphere.

2. A laser arc hybrid welding method for fillet-welding or butt-welding aluminum steel sheets by performing laser light irradiation and arc discharge, thereby combining laser welding and arc welding, comprising:

irradiating the aluminum steel sheets with laser light while focusing the laser light on the aluminum steel sheets to diffuse an aluminum vapor in a plasma state from a position of laser irradiation onto the aluminum steel sheets, and to form a keyhole at the position of laser irradiation;

generating an arc between an arc electrode, which consists essentially of aluminum and is provided coaxially with an optical axis of the laser light, and the aluminum steel sheets; and rendering a transfer mode of a welding droplet from the arc electrode spray transfer to hold a range from a leading end portion of the arc electrode to the keyhole in an aluminum vapor atmosphere.

* * * * *